United States Patent [19]
Asano et al.

[11] Patent Number: 5,609,789
[45] Date of Patent: Mar. 11, 1997

[54] COBALT-CONTAINING MAGNETIC IRON OXIDE AND PROCESS FOR PRODUCING THE SAME

[75] Inventors: Kiyoshi Asano; Arata Koyama; Nobusuke Takumi; Shigeru Takatori; Kouichi Tamura; Tokuo Suita, all of Yokkaichi, Japan

[73] Assignee: Ishihara Sangyo Kaisha, Ltd., Osaka, Japan

[21] Appl. No.: 635,540

[22] Filed: Apr. 22, 1996

Related U.S. Application Data

[63] Continuation of Ser. No. 174,469, Dec. 28, 1993, abandoned.

[30] Foreign Application Priority Data

Dec. 29, 1992 [JP] Japan ..................... 4-362114
Feb. 2, 1993 [JP] Japan ..................... 5-052843

[51] Int. Cl.$^6$ .................................. C04B 35/26
[52] U.S. Cl. ..................... 252/62.56; 428/403
[58] Field of Search ............ 252/62.56; 423/634; 428/403, 694 BA

[56] References Cited

U.S. PATENT DOCUMENTS

| | | | |
|---|---|---|---|
| 3,904,540 | 9/1975 | Bennetch et al. | 252/62.54 |
| 4,176,172 | 11/1979 | Bennetch et al. | 252/62.56 |
| 4,213,959 | 7/1980 | Brodt et al. | 423/634 |
| 4,382,822 | 5/1983 | Mayer | 106/306 |
| 4,448,761 | 5/1984 | Sarnecki et al. | 423/632 |
| 4,464,352 | 8/1984 | Autzen et al. | 423/634 |
| 4,713,261 | 12/1987 | Masaki et al. | 252/62.56 |
| 5,314,750 | 5/1994 | Takedoi et al. | 423/632 |

FOREIGN PATENT DOCUMENTS

| | | |
|---|---|---|
| 0024693 | 3/1981 | European Pat. Off. . |
| 0078950 | 5/1983 | European Pat. Off. . |
| 3516885 | 11/1986 | Germany . |
| 3627133 | 2/1988 | Germany ............. 252/62.56 |
| 57-45206 | 3/1982 | Japan ................... 252/62.56 |
| 57-129828 | 8/1982 | Japan . |
| 58-84407 | 5/1983 | Japan . |
| 58-74529 | 5/1983 | Japan . |
| 63-69714 | 3/1988 | Japan . |
| 63-69715 | 3/1988 | Japan . |

*Primary Examiner*—Melissa Bonner
*Attorney, Agent, or Firm*—Cushman Darby & Cushman IP Group of Pillsbury Madison & Sutro LLP

[57] ABSTRACT

Cobalt-containing magnetic iron oxide particles extremely suitable for magnetic recording mediums, especially for image recording mediums and a process for producing the same from the precursor, $\gamma$-FeOOH which is advantageous in industry are disclosed. Cobalt-containing magnetic iron oxide particles satisfying the following equations (1), (2) and (3):

$$20 \leq SSA \leq 50 \tag{1}$$

$$-16.70 \leq \log [V] \leq -3.05 \log [SSA] - 11.35 \tag{2}$$

$$0.10 \leq Fe^{2+}/\text{total } Fe \leq 0.30 \tag{3}$$

where SSA is a BET specific surface area (m$^2$/g), and V is a magnetic switching unit (cm$^3$), can be produced by producing iron oxide particles having a concentration of Fe$^{2+}$ of 0.10 to 0.36 as expressed by Fe$^{2+}$/total Fe from the precursor, $\gamma$-FeOOH, and coating a cobalt compound or a combination of a cobalt compound and other metal compounds on the surfaces of the iron oxide particles.

9 Claims, 1 Drawing Sheet

FIG. 1

COBALT-CONTAINING MAGNETIC IRON OXIDE AND PROCESS FOR PRODUCING THE SAME

This is a continuation of application Ser. No. 08/174,469, filed on Dec. 28, 1993, which was abandoned upon the filing hereof.

BACKGROUND OF THE INVENTION

Field of the Invention

The present invention relates to cobalt-containing magnetic iron oxide particles useful for the elements in magnetic recording mediums, especially for those in image recording mediums and a process for producing the particles. More particularly, the present invention relates to cobalt-containing magnetic iron oxide particles extremely suitable for production of magnetic recording mediums having an excellent video noise characteristic and a process for production of such particles.

Description of Related Art

Magnetic iron oxides for use in magnetic recording mediums such as audio tapes, video tapes, magnetic disks, and magnetic cards can be produced by various methods including a process where a solution of any one of various iron salts such as iron sulfate and iron chloride is neutralized with alkali and then oxidized to produce hydrous iron oxides such as acicular goethite, $\alpha$—FeOOH, or lepidocrocite, $\gamma$—FeOOH as precursors which are sequentially subjected to firing (dehydration, tempering), reduction and oxidation to produce acicular magnetite ($Fe_3O_4$) and maghemite ($\gamma$—$Fe_2O_3$), thereby producing the magnetic iron oxide particles suitable primarily for acoustic recording mediums; and a process where the magnetic iron oxide as described immediately above are further subjected to a coating treatment with a cobalt compound to produce Co—$Fe_3O_4$ and Co—$\gamma$—$Fe_2O_3$, thus producing the cobalt-containing magnetic iron oxide particles having a high coercive force suitable primarily for image recording mediums, as most popular techniques.

In the production of the cobalt-containing magnetic iron oxide particles from the precursors such as goethite ($\alpha$—FeOOH) and lepidocrocite ($\gamma$—FeOOH), for example, in the case of $\alpha$—FeOOH, it is dehydrated at a temperature of 250° C. to 800° C. to convert to $\alpha$—$Fe_2O_3$ and subsequently reduced at a temperature of 300° C. to 500° C. to produce $Fe_3O_4$, or further oxidized at a temperature of 200° C. to 300° C. to produce $\gamma$—$Fe_2O_3$, followed by coating the surfaces of the particles with a cobalt-containing metal compound to produce the cobalt-containing magnetic iron oxide particles. The dehydration of $\alpha$—FeOOH may be completed at a temperature of 250° C. to 300° C. to convert the $\alpha$—FeOOH to $\alpha$—$Fe_2O_3$, which is then generally subjected to the heat-treatment at a relatively high temperature of 600° C. to 800° C., to effect the growth of the $\alpha$—$Fe_2O_3$ crystals as well as reduction of the voids produced by the dehydration reaction. This improves the magnetic characteristics of the cobalt-containing magnetic iron oxide particles derived therefrom.

On the other hand, $\gamma$—FeOOH is characterized by scarcely forming twinned crystals in the course of precipitation in contrast to $\alpha$—FeOOH. Thus, the ultimate magnetic particles produced from the precursor $\gamma$—FeOOH are said to be straight acicular particles having no branched structure which have a higher dispersibility in synthetic resin mediums in the course of processing the particles into magnetic tapes, an excellent orientating property and a higher coercive force to facilitate the production of much better products. The thermal dehydration of $\gamma$—FeOOH at a relatively low temperature of 250° C. to 300° C. yields directly $\gamma$—$Fe_2O_3$. However, this $\gamma$—$Fe_2O_3$ is poor in crystallinity, which causes insufficient magnetic characteristics. For this reason, some attempts have been made to produce $\gamma$—$Fe_2O_3$ particles useful for acoustic recording mediums by reducing the $\gamma$—FeOOH and oxidizing the reduced product [JP 47-40097A, JP 57-129828A and JP 58-84127A]; or by dehydrating the $\gamma$—FeOOH, followed by reduction and oxidation [JP 39-20939B, JP 54-28299A and JP 58-84407A]. In the course of such procedures, an additional attempt has also been made to conduct the thermal dehydration of the $\gamma$—FeOOH at a temperature of 500° C. or higher to convert once to a dense crystalline $\alpha$—$Fe_2O_3$ in the same manner as in the case of $\alpha$—FeOOH, and thereafter to conduct the reduction and oxidation. Moreover, in the process for the production of $\gamma$—$Fe_2O_3$, a technique of preventing the particles from sintering therebetween and deformation thereof during the heat-treatment by treating the $\gamma$—FeOOH particles with an organic compound of Ti, B, Si, P and the like has been proposed [JP 57-129828A, JP 58-74529A, JP 58-84407A, JP 63-69714A, and JP 63-69715A]. However, the $\gamma$—FeOOH particles are more likely to cause sintering therebetween as well as deformation of the particle shape during heat-treatment than the $\alpha$—FeOOH particles, and generally speaking, the resulting $\gamma$—$Fe_2O_3$ particles have in most cases inferior characteristics to those of the particles drived from the precursor $\alpha$—FeOOH.

As compared with acoustic recording, image recording requires a higher recording density and the elements to be used in the mediums therefor are required to have improved magnetic characteristics such as coercive force and the like as well as specifically excellent noise characteristics. The noise characteristics are closely correlated with the particle volume of the elements, i.e., magnetic particles in the recording mediums in a manner as the smaller the particle volume, the better the noise characteristics. As a measure identifying the particle volume in general, the BET specific surface area has been conveniently used and it has been known that a larger BET specific surface area results in better noise characteristics. Making the recording elements finer, therefore, may lead to an improvement in noise characteristics, but simultaneously it causes an increase in surface activity of the particles which may facilitate coagulation of the particles during the formation of a paint with the particles in the process for production of recording mediums. As a result, a satisfactory dispersion becomes impossible to achieve making it difficult to improve the noise characteristics.

In case the precursor $\gamma$—FeOOH is used, the particles thereof are more susceptible to sintering between the particles and deformation of the particle form than the $\alpha$—FeOOH particles in the course of the heat-treatments for dehydration, and inter alia, for reduction, with an decrease in the size of the particles. Thus, the current technique in the art is far from satisfactorily taking the advantages of the $\gamma$—FeOOH. Under these circumstances, most elements to be used in image recording mediums have been generally derived from the precursor $\alpha$—FeOOH. There have remained not a few problems to be solved in the production of cobalt-containing magnetic iron oxide particles suitable for the elements in the image recording mediums using the $\gamma$—FeOOH as precursor.

More recently, it has been pointed out that the use of the specific surface area of the particles (BET specific surface area), which has most generally been used as a characteristic value representing the size of a magnetic particle having a predominant influence on the noise characteristics of the magnetic recording mediums, is not necessarily appropriate, and in place of the specific surface area, a proposal has been made to use a physical amount such as magnetic switching unit.

SUMMARY OF THE INVENTION

An object of the present invention is to provide cobalt-containing magnetic iron oxide particles having an optimum magnetic switching unit which is capable of satisfying the requirements about the aforementioned noise characteristics and the like.

Another object of the present invention is to provide a process for producing cobalt-containing magnetic iron oxide particles suitable for, inter alia, image recording by using the precursor γ—FeOOH which tends to produce magnetic particles having a good acicularity without being branched in the course of the production of said cobalt-containing magnetic iron oxide particles.

According to the first aspect of the present invention, there is provided cobalt-containing magnetic iron oxide particles satisfying the following equations (1), (2) and (3):

$$20 \leq SSA \leq 50 \tag{1}$$

$$-16.70 \leq \log[V] \leq -3.05 \log[SSA] - 11.35 \tag{2}$$

$$0.10 \leq Fe^{2+}/\text{total } Fe \leq 0.30 \tag{3}$$

where SSA is a BET specific surface area ($m^2/g$), and V is a magnetic switching unit ($cm^3$).

According to the second aspect of the present invention, there is provided the cobalt-containing magnetic iron oxide particles as stated in the first aspect, wherein the equation (2) is $-16.70 \leq \log[V] \leq -3.05 \log[SSA] - 11.50$.

According to the third aspect of the present invention, there is provided the cobalt-containing magnetic iron oxide particles as stated in the first aspect, wherein the equation (3) is $0.20 \leq Fe^{2+}/\text{total } Fe \leq 0.30$.

According to the fourth aspect of the present invention, there is provided a process for producing the cobalt-containing magnetic iron oxide particles as stated in the first aspect, wherein iron oxide particles are produced by directly reducing lepidocrocite particles, or thermally dehydrating lepidocrocite particles at a lower temperature than that causing transformation to hematite particles and then reducing the dehydrate, or effecting such a reduction and then oxidation at a temperature of 200° C. or lower, thereby producing iron oxide particles having a concentration of $Fe^{2+}$ of 0.10 to 0.36 as expressed by $Fe^{2+}/\text{total Fe}$, and then a cobalt compound or a combination of a cobalt compound and at least one of other metal compounds is coated on the surfaces of the iron oxide particles in an oxidizing or inert atmosphere.

According to the fifth aspect of the present invention, there is provided the process for producing cobalt-containing magnetic iron oxide particles as stated in the fourth aspect, wherein the iron oxide particles have a concentration of $Fe^{2+}$ of 0.20 to 0.36 as expressed by $Fe^{2+}/\text{total Fe}$.

According to the sixth aspect of the present invention, there is provided the process for producing cobalt-containing magnetic iron oxide particles as stated in the fourth aspect, wherein the iron oxide particles have a concentration of $Fe^{2+}$ of 0.28 to 0.36 as expressed by $Fe^{2+}/\text{total Fe}$.

According to the seventh aspect of the present invention, there is provided the process for producing cobalt-containing magnetic iron oxide particles as stated in the sixth aspect, wherein the lepidocrocite particles have an aluminum compound coated on the surfaces of the particles.

According to the eighth aspect of the present invention, there is provided the process for producing cobalt-containing magnetic iron oxide particles as stated in the seventh aspect, wherein the amount of the aluminum compound coated is 0.05 to 3.0% by weight Al based on the weight of the lepidocrocite.

DETAILED DESCRIPTION OF PREFERRED EMBODIMENTS

It has been found with respect to the correlation with the BET specific surface area that the magnetic switching unit of the cobalt-containing magnetic iron oxide particles having a specific surface area in a specified range which have been produced by subjecting the precursor γ-FeOOH to a specified heat-treatment to produce iron oxide particles and coating a cobalt compound on the surfaces of the produced particles has an extremely small magnetic switching unit than that of the cobalt-containing magnetic iron oxide particles which have been produced via $\alpha$-$Fe_2O_3$, for example, by using α-FeOOH particles as precursor, or by dehydrating the γ-FeOOH at high temperatures to produce $\alpha$-$Fe_2O_3$, and that the relationship between the magnetic switching unit (V) and the BET specific surface area (SSA) should be satisfy the following equation:

$$\log[V] \leq -3.05 \log[SSA] - 11.35,$$

more preferably:

$$\log[V] \leq -3.05 \log[SSA] - 11.50.$$

According to the present invention, the iron oxide particles comprising primarily magnetite produced by directly reducing the γ—FeOOH, or thermally dehydrating the γ—FeOOH at a lower temperature than the transformation temperature thereof to α—$Fe_2O_3$ and then reducing the dehydrate retains well their particle shape, and they are composed of small magnetite crystals, the growth of which has been suppressed, resulting in small magnetic switching units. Moreover, the iron oxide particles comprising primarily magnetite can be subsequently oxidized to produce iron oxide particles comprising berthollide and maghemite, in which process the crystal growth is very small, so that the variation in the magnetic switching unit is very small. Moreover, it has been found that when such iron oxide particles are coated with a cobalt compound to modify the surfaces thereof with cobalt, the variation in the magnetic switching unit is also extremely small. Furthermore, it has been also found that the noise characteristic of a luminance signal (Y-S/N) has a close relation with the magnetic switching unit rather than the particle volume of the cobalt-containing magnetic iron oxide particles.

On the basis of the foregoing, we have made a research to further improve the noise characteristic of a color signal (C-S/N) when the cobalt-containing magnetic iron oxide particles are employed in image recording mediums. That is, the C-S/N is attributable to a relatively long term flatness of the surfaces of the magnetic recording mediums and the surface property of the recording mediums is significantly depending upon the technique of coating in the process of the production of the recording mediums. In order to improve the characteristic C-S/N, particularly the magnetic particles are earnestly desired to be improved in dispersibility and orientating property since these properties have a great influence on the noise characteristic of color signal (C-S/N). In order to achieve the improvement in dispersibility and orientating property, it is very important to suppress the collapse of particle shape, agglomeration between particles and an increase in magnetic switching unit during the thermal reduction and thermal oxidation treatments of the precursor $\gamma$—FeOOH particles as much as possible. To solve these problems a study has been made about the results of treatments depositing various metal compounds on the $\gamma$—FeOOH particles before the heat-treatment. As a result, it has been found that the aluminum compound deposited $\gamma$—FeOOH particles may be subjected to the aforementioned heat-treatment and coated with a cobalt compound to produce cobalt-containing magnetic iron oxide particles having further improved dispersibility and orientating property, with which there can be produced image recording mediums which are excellent in magnetic characteristics such as SQ, OR and SFD as well as extremely excellent in C-S/N. The process of the present invention allows the production of magnetic iron oxide particles which are excellent in magnetic characteristics such as saturation magnetization and the like as compared with the $\gamma$—$Fe_2O_3$ based cobalt-containing magnetic iron oxide particles and which makes it possible to reduce the light transmittance of the magnetic recording mediums. Therefore, the magnetic iron oxide particles according to the present invention are more desirable for use in the production of magnetite or berthollide based cobalt-containing magnetic iron oxide particles which have recently been put into practical use in rapid progress.

As used in the present specification, the term "magnetic switching unit (V)" refers to the value obtained for each sample by the procedure reported by M. P. Sharrock et al in the article, IEEE Transactions on Magnetics, Vol. MAG-17, No. 6, November (1981) pp. 3020–3022, as follows:

A sample powder is charged in a vessel, which is set in a sample-vibrating type magnetometer (VSM-P7, available from TOEI KOGYO) with a maximum magnetic field applied being set at 10 kOe and a magnetic field sweeping velocity being 10 kOe/x min., where the time x is varied for (1) 20 minutes, (2) 100 minutes and (3) 200 minutes, to evaluate the coercive force Hc (i) where i=1, 2 or 3 and the saturation magnetization Ms (gauss) of each sample.

Then the magnetic switching time t (i) is obtained according to the following equation:

$$t(i) = Hc(i) \times \frac{x \times 60}{10,000} \text{ (sec.)}$$

Using three sets of t (i) and Hc (i), the following expression formula is determined to evaluate Ha and K·V:

$$Hc(t) = Ha \left\{ 1 - \left[ \frac{k \cdot T}{K \cdot V} \ln\left( \frac{A \cdot t}{0.693} \right) \right]^{1/2} \right\}$$

where

Ha: Anisotropic magnetic field (Oe)
k: Boltzmann's constant ($1.38 \times 10^{-16}$ erg/deg)
T: Found temperature (measured at 300K)
K: Anisotropy constant (erg/cm$^3$)
V: magnetic switching unit (cm$^3$)
A: Spin precessional frequency ($2 \times 10^9$ sec$^{-1}$)

Finally using the following relationship:

Ha=2K/Ms the magnetic switching unit V can be determined from the following formula:

V=(K·V)/(Ha·Ms/2)

The lepidocrocite ($\gamma$—FeOOH) to be used as precursor in the present invention can be produced by various methods. Particularly the acicular $\gamma$—FeOOH which can be produced by wet neutralization and oxidation of an aqueous ferrous chloride solution should preferably be used. In the course of the production of the $\gamma$—FeOOH a small amount of a metal compound containing P, Si and/or Al may be included to control the shape of the $\gamma$—FeOOH particles.

The aluminum compounds to be used for depositing on the surfaces of the $\gamma$—FeOOH particles include aluminum chloride, aluminum sulfate, aluminum nitrate, sodium aluminate. The amount of these aluminum compounds to be deposited should be in the range of 0.05 to 3.0% by weight, preferably 0.05 to 1.0% by weight Al based on the weight of the $\gamma$—FeOOH particles. A lower amount of the aluminum compounds deposited may lead to unsatisfactory effects in the deposition treatment, while a higher amount may undesirably result in an reduction in the saturation magnetization of the end cobalt-containing magnetic iron oxide particles. The deposition of the aluminum compounds onto the surfaces of the $\gamma$—FeOOH particles may be achieved by various techniques, for example, an aqueous ferrous chloride solution is subjected to wet neutralization and oxidation to produce a $\gamma$—FeOOH slurry, to which an aqueous solution of the aforementioned aluminum compound in an appropriate concentration thereof and an aqueous alkaline solution are added to accomplish the deposition under neutralization; or an aqueous solution of the aluminum compound and an aqueous alkaline solution are added to a slurry of the $\gamma$—FeOOH particles in water to accomplish the deposition under neutralization. The deposition of the aluminum compounds may be conducted in combination with any compounds of Si, P, and/or B.

After the treatment by the deposition of the aluminum compounds, the $\gamma$—FeOOH particles containing aluminum on the surfaces thereof can be produced via usual filtration, washing with water, and drying step.

Although the present invention does not necessarily require the dehydration step for the $\gamma$—FeOOH particles, the dehydration is preferred to increase the reaction velocity in the reduction step and to enhance the utilization rate of a $H_2$ gas when it is used as reducing agent. The temperature for dehydration must be lower than that causing transformation of the $\gamma$—FeOOH particles into $\alpha$—$Fe_2O_3$, and should be not higher than about 450° C., preferably 250° C. to 350° C.

If the dehydration is effected at a higher temperature than the defined range, the γ—FeOOH particles transform into α—$Fe_2O_3$ particles having a higher velocity of crystal growth, which α—$Fe_2O_3$ particles can be converted through reduction to iron oxide particles such as magnetite, or berthollide and maghemite after further oxidation, or cobalt-containing magnetic iron oxide particles after still further treatment by the deposition with a cobalt compound, these iron oxide particles obtained being not so low in magnetic switching in it as desired level. Moreover, the α-$Fe_2O_3$ particles produced by conversion from the α-FeOOH are liable to cause agglomeration between the particles as compared with those from α—FeOOH particles, which α-$Fe_2O_3$ particles can be converted through reduction to iron oxide particles such as magnetite, or berthollide and maghemite after further oxidation, or cobalt-containing magnetic iron oxide particles after still further treatment by the deposition with a cobalt compound, these iron oxide particles being poor in magnetic characteristics as well as in dispersibility in a paint to be prepared with such particles for the production of magnetic recording mediums. The dehydration treatment may be conducted in an oxidizing or inert gas atmosphere, the γ-FeOOH particles should preferably be dehydrated in an oxidizing atmosphere of air and the like since the dehydration of the γ-FeOOH particles in an inert atmosphere of $N_2$ or the like tends to cause some sintering between particles and deformation of the particle shape.

The reduction may be performed by any conventional method. For example, it may be performed under a flowing hydrogen gas with or without water vapor at a temperature in the range of 250° C. to 400° C., or by a method of reducing at a temperature in the range of 250° C. to 500° C. with organic materials such as gases produced by decomposition of fatty acids such as soybean oil, coconut oil, oleic acid, stearic acid and the like. In the reduction, an increased temperature for the treatment appears to have a tendency to somewhat increase the magnetic switching unit of the produced magnetite. Therefore, the temperature for the reduction should preferably be as low as possible in the above defined range so far as it is capable of allowing the reduction to substantially proceed. The iron oxide particles comprising predominantly magnetite produced by the reduction, or those produced by further oxidizing said iron oxide particles, i.e., the iron oxide particles comprising primarily berthollide or maghemite should preferably have a magnetic switching unit satisfying the following relationship between the magnetic switching unit (V) and the BET specific surface area (SSA):

$$\log[V] \leq -3.05 \log[SSA] - 11.35$$

The surfaces of the iron oxide particles produced as described above may be coated with a cobalt compound or a combination of a cobalt compound and at least one of other metal compounds to produce cobalt-containing magnetic iron oxide particles satisfying the following equations (1) to (3):

$$20 \leq SSA \leq 50 \quad (1)$$

$$-16.70 \leq \log[V] \leq -3.05 \log[SSA] - 11.35 \quad (2)$$

$$0.10 \leq Fe^{2+}/\text{total Fe} \leq 0.30 \quad (3)$$

where SSA is a BET specific surface area ($m^2/g$), and V is a magnetic switching unit ($cm^3$).

In the present invention, the requirements expressed by the aforementioned equations (1) to (3) must be simultaneously satisfied. If a value of $Fe^{2+}$/total Fe is lower than the above defined range, the light transmittance of magnetic recording mediums with the iron oxide particles becomes too high causing problems, while if it is higher than the above defined range, the stability in oxidation of the magnetic iron oxide particles tends to be diminished. A smaller specific surface area than the defined range precludes the image recording mediums with the iron oxide particles from having a higher recording density, while a larger specific surface area than the defined range makes it difficult to achieve a desired dispersion of the magnetic particles into magnetic recording mediums. Too low a magnetic switching unit outside the above defined range obstruct development of ferromagnetic characteristics, while too high a magnetic switching unit makes it difficult to achieve a desired excellent noise characteristics.

Other metal compounds to be used with the cobalt compounds include those of Fe, Mn, Zn, Ni, Cr and the like, and they may used optionally for the purpose of improving the characteristics of cobalt-containing magnetic iron oxide particles.

A cobalt compound, or a combination of a cobalt compound and at least one of other metal compounds may be coated on the surfaces of the magnetic particles by 1) a method comprising the steps of dispersing the iron oxide particles into an aqueous solution of a cobalt salt or a cobalt salt and at least one of other metal salts and adding an aqueous alkaline solution to the dispersion, or 2) a method comprising the steps of dispersing the iron oxide particles into an aqueous alkaline solution and adding an aqueous solution of a cobalt salt or a cobalt salt and at least one of other metal salts to the resultant alkaline dispersion. The coating may be conducted in air, or in either oxidizing or inert atmosphere at a reaction temperature in the range from room temperature to a boiling point or higher depending upon the chemical properties of the compounds to be deposited and coating procedures.

For the purpose of improving the dispersion of the produced cobalt-containing magnetic iron oxide particles in a paint to be prepared, the magnetic particles after coated with the cobalt compound may be further treated on their surfaces with compounds of Si, Al and the like. The present invention will be illustrated further in detail with reference to Examples.

EXAMPLE 1

Acicular γ—FeOOH particles having a BET specific surface area of about 78 $m^2$/gram were thermally dehydrated in a muffle furnace in air at a temperature of 300° C. for 30 minutes. The X-ray diffraction pattern of the produced powder indicated that there were observed broad diffraction peaks of α—$Fe_2O_3$ without any diffraction peaks of γ—$Fe_2O_3$. 500 grams of this γ—$Fe_2O_3$ powder were charged in a small sized rotary kiln and thermally reduced under a hydrogen gas flowing at 3 liters/minute at 280° C. for one hour, followed by cooling to obtain a reduced powder which was added to 3 liters of water and then recovered. The chemical analysis of this reduced powder indicated that the particles thereof have a $Fe^{2+}$/total Fe of 0.306.

A small amount of the sample taken from the powder was dried in a $N_2$ atmosphere at 60° C. to produce a dried product which was evaluated for various characteristics. The following results were obtained: SSA=32.4 $m^2$/gram, Hc=323 Oe, V=0.34×$10^{-16}$ $cm^3$.

The recovered slurry was agitated by a mixer for 20 minutes to enhance the dispersion and then diluted with water to a solid content of 100 grams/liter. 2 liters of this slurry were charged in a 4 neck flask and then 368 milliliters of an aqueous 10N NaOH solution were added to the slurry. Then with stirring 336 milliliters of of an aqueous 1 mol/liter ferrous chloride solution were added over 45 minutes and thereafter 98 milliliters of an aqueous 1 mol/liter cobalt sulfate solution were added over 60 minutes. Thereafter, the temperature was increased to 45° C. and stirred for 5 hours to complete the cobalt-coating treatment. The resultant slurry was filtered, washed, and dried in an atmosphere of nitrogen gas at 120° C. to produce cobalt-containing magnetic iron oxide particles (Sample A).

EXAMPLE 2

500 grams of acicular γ—FeOOH particles having a BET specific surface area of about 78 $m^2$/gram were charged in a small sized rotary kiln and purged with a $N_2$ gas to expel the air contained in the kiln and thermally reduced under a hydrogen gas flowing at 3 liters/minute at 270° C. for one hour. After cooling, the reduced powder was added to 3 liters of water and then recovered.

The reduced powder was evaluated for various characteristics in the same manner as in Example 1. The following results were obtained: $Fe^{2+}$/total Fe=0.327, SSA=32.4 $m^2$/gram, Hc=318 Oe, V=0.32×$10^{-16}$ $cm^3$.

The recovered slurry was enhanced in dispersion and subjected to the cobalt-coating treatment in the same manner as in Example 1 to produce cobalt-containing magnetic iron oxide particles (Sample B).

EXAMPLE 3

500 grams of acicular γ—FeOOH particles having a BET specific surface area of about 56 $m^2$/gram and a aluminum content of 0.5% by weight were charged in a small sized rotary kiln and thermally dehydrated under air flowing at 3 liters/minute at 280° C. for one hour. After the kiln was purged with a $N_2$ gas to expel the air contained therein, the thermal reduction of the dehydrated particles was performed under a hydrogen gas flowing at 3 liters/minute at 360° C. for one hour. After cooling, the reduced powder was added to 3 liters of water and then recovered.

The reduced powder was evaluated for various characteristics in the same manner as in Example 1. The following results were obtained: $Fe^{2+}$/total Fe=0.330, SSA=25.5 $m^2$/gram, Hc=376 Oe, V=0.51×$10^{-16}$ $cm^3$.

The recovered slurry was enhanced in dispersion and subjected to the cobalt-coating treatment in the same manner as in Example 1, except that the amounts of the aqueous 10N NaOH solution, the aqueous 1 mol/liter ferrous chloride solution and the aqueous 1 mol/liter cobalt sulfate solution were changed to 324 milliliters, 236 milliliters and 68 milliliters, respectively, to produce cobalt-containing magnetic iron oxide particles (Sample C).

EXAMPLE 4

500 grams of acicular γ—FeOOH particles having a BET specific surface area of about 56 $m^2$/gram and an aluminum content of 0.5% by weight were charged in a small sized rotary kiln and thermally dehydrated under air flowing at 3 liters/minute at 280° C. for one hour. After the kiln was purged with a $N_2$ gas to expel the air contained therein, the thermal reduction of the dehydrated particles was performed under a hydrogen gas flowing at 3 liters/minute at 360° C. for one hour. After allowed to stand cooling while the kiln was purged with $N_2$ to expel the hydrogen gas contained therein, the reduced powder was oxidized at 150° C. for 1.5 hours under a gaseous mixture of air and $N_2$ (air/$N_2$=1/1 by volume) flowing at 3 liters/minute to produce a berthollide powder.

After leaving to stand cooling, the recovered berthollide particles had the following characteristics: $Fe^{2+}$/total Fe=0.150, SSA=24.0 $m^2$/gram, Hc=378 Oe, V=1.90×$10^{-16}$ $cm^3$.

The berthollide powder was dispersed by the procedure identical to that in Example 1, and subjected to the cobalt-coating treatment in the same manner as in Example 1, except that the amounts of the aqueous 10N NaOH solution, the aqueous 1 mol/liter ferrous chloride solution and the aqueous 1 mol/liter cobalt sulfate solution were changed to 342 milliliters, 276 milliliters and 84 milliliters, respectively, to produce cobalt-containing magnetic iron oxide particles (Sample D).

EXAMPLE 5

500 grams of acicular γ—FeOOH particles having a BET specific surface area of about 74 $m^2$/gram and a phosphorus content of 0.44% by weight and a silicon content of 0.18% by weight were charged in a small sized rotary kiln and thermally dehydrated under air flowing at 3 liters/minute at 330° C. for one hour. After the kiln was purged with a $N_2$ gas to expel the air contained therein, the thermal reduction of the dehydrated particles was performed under a hydrogen gas flowing at 3 liters/minute at 330° C. for one hour. After cooling, the reduced powder was added to 3 liters of water and recovered.

The reduced particles were evaluated for various characteristics in the same manner as in Example 1. The following results were obtained: $Fe^{2+}$/total Fe=0.338, SSA=36.8 $m^2$/gram, Hc=273 Oe, V=0.24×$10^{-16}$ $cm^3$.

The recovered slurry was enhanced in dispersion, and subjected to the cobalt-coating treatment in the same manner as in Example 1 to produce cobalt-containing magnetic iron oxide particles (Sample E).

EXAMPLE 6

500 grams of acicular γ—FeOOH particles having a BET specific surface area of about 95 $m^2$/gram and a phosphorus content of 0.44% by weight and a silicon content of 0.18% by weight were charged in a small sized rotary kiln and thermally dehydrated under air flowing at 3 liters/minute at 330° C. for one hour. After the kiln was purged with a $N_2$ gas to expel the air contained therein, the thermal reduction of the dehydrated particles was performed at 330° C. for one hour under a hydrogen gas flowing at 3 liters/minute. After cooling, the reduced powder was added to 3 liters of water and recovered.

The reduced particles were evaluated for various characteristics in the same manner as in Example 1. The following results were obtained: $Fe^{2+}$/total Fe=0.345, SSA=42.2 $m^2$/gram, Hc=254 Oe, V=0.20×$10^{-16}$ $cm^3$.

The recovered slurry was enhanced in dispersion identically to the case in Example 1 and subjected to the cobalt-coating treatment in the same procedure as in Example 1, except that the amounts of the aqueous 10N NaOH solution, the aqueous 1 mol/liter ferrous chloride solution and the aqueous 1 mol/liter cobalt sulfate solution were changed to 389 milliliters, 390 milliliters and 110 milliliters, respectively, to produce cobalt-containing magnetic iron oxide particles (Sample F).

Comparative Example 1

500 grams of acicular γ—FeOOH particles having a BET specific surface area of about 83 m$^2$/gram and a phosphorus content of 0.44% by weight were charged in a small sized rotary kiln and thermally dehydrated under air flowing at 3 liters/minute at 630° C. for 1.5 hours. After the kiln was purged with a N$_2$ gas to expel the air contained therein, the thermal reduction of the dehydrated particles was performed at 320° C. for 4 hours under a hydrogen gas flowing at 3 liters/minute. After cooling, the reduced powder was added to 3 liters of water and recovered.

The reduced particles were evaluated for various characteristics in the same manner as in Example 1. The following results were obtained: Fe$^{2+}$/total Fe=0.336, SSA=33.8 m$^2$/gram, Hc=277 Oe, V=1.38×10$^{-16}$ cm$^3$.

The recovered slurry was enhanced in dispersion identically to the case in Example 1 and subjected to the cobalt-coating treatment in the same procedure as in Example 1, except that the amounts of the aqueous 10N NaOH solution, the aqueous 1 mol/liter ferrous chloride solution and the aqueous 1 mol/liter cobalt sulfate solution were changed to 380 milliliters, 362 milliliters and 110 milliliters, respectively, to produce a comparative sample of cobalt-containing magnetic iron oxide particles (Sample G).

Comparative Example 2

500 grams of acicular α—FeOOH particles having a BET specific surface area of about 66 m$^2$/gram and 22.5 grams of oleic acid were charged in a small sized rotary kiln, heated to a temperature of 450° C. over one hour, and maintained at the temperature for further one hour to effect the dehydration and reduction. After cooling, the reduced powder was added to 3 liters of water and recovered.

The reduced particles were evaluated for various characteristics in the same manner as in Example 1. The following results were obtained: Fe$^{2+}$/total Fe=0.370, SSA=38.7 m$^2$/gram, Hc=357 Oe, V=0.95×10$^{-16}$ cm$^3$.

The recovered slurry was agitated by a mixer for 20 minutes to enhance the dispersion and then diluted with water to a solid content of 100 grams/liter. 2 liters of this slurry were charged in a 4 neck flask and then 80 milliliters of an aqueous 10N NaOH solution were added to the slurry. Then with stirring 122 milliliters of of an aqueous 1 mol/liter cobalt sulfate solution were added over 60 minutes. Thereafter, the temperature was increased to 45° C. and stirred for 5 hours to complete the cobalt-coating treatment. The resultant slurry was filtered, washed, and dried in an atmosphere of nitrogen gas at 120° C. to produce a comparative sample of cobalt-containing magnetic iron oxide particles (Sample H).

Comparative Example 3

Acicular γ—FeOOH particles having a BET specific surface area of about 42 m$^2$/gram were thermally dehydrated in a muffle furnace in air at a temperature of 500° C. for 30 minutes. The X-ray diffraction pattern of the produced powder indicated that there were observed sharp diffraction peaks of α—Fe$_2$O$_3$. 500 grams of this α—Fe$_2$O$_3$ powder were impregnated with 20 grams of soybean oil and then charged in a small sized rotary kiln and heated to a temperature of 500° C. over one hour under a nitrogen gas flowing at 1.5 liters/minute, followed by maintaining for further one hour. Again the powder was subjected to an oxidation treatment at 350° C. under a gaseous mixture of air and nitrogen gas (a ratio of air/N$_2$ by volume=1/1) flowing at 1.5 liters/minute to produce γ—Fe$_2$O$_3$ particles.

The γ—Fe$_2$O$_3$ particles recovered after cooling had the following characteristics: SSA=26.8 m$^2$/gram, Hc=342 Oe, V=6.36×10$^{-16}$ cm$^3$.

This γ—Fe$_2$O$_3$ particles were subjected to the dispersion treatment identical to that in Example 1 and then subjected to the cobalt-coating treatment in the same procedure as in Example 1, except that the amounts of the aqueous 10N NaOH solution, the aqueous 1 mol/liter ferrous chloride solution and the aqueous 1 mol/liter cobalt sulfate solution were changed to 391 milliliters, 402 milliliters and 96 milliliters, respectively, to produce a comparative sample of cobalt-containing magnetic iron oxide particles (Sample I).

Comparative Example 4

500 grams of acicular α—FeOOH particles having a BET specific surface area of about 50 m$^2$/gram and a phosphorus content of 0.44% by weight were charged in a small sized rotary kiln and thermally dehydrated at a temperature of 720° C. for 2 hours under air flowing at 3 liters/minute. After the kiln was purged with a N$_2$ gas to expel the air contained therein, the thermal reduction of the dehydrated particles was performed at 360° C. for 2 hours under a hydrogen gas flowing at 3 liters/minute. Then, after allowed to stand cooling while the kiln was purged with N$_2$ to expel the hydrogen gas contained therein, the reduced powder was oxidized at 280° C. for 1.5 hours under a gaseous mixture of air and N$_2$ gas (a ratio by volume of air/N$_2$=1/1) flowing at 3 liters/minute to produce γ—Fe$_2$O$_3$ particles.

The γ—Fe$_2$O$_3$ particles recovered after cooling had the following characteristics: SSA=31.1 m$^2$/gram, Hc=400 Oe, V=3.20×10$^{-16}$ cm$^3$.

This γ—Fe$_2$O$_3$ particles were was subjected to the dispersion treatment identical to that in Example 1 and then subjected to the cobalt-coating treatment in the same procedure as in Example 1, except that the amounts of the aqueous 10N NaOH solution, the aqueous 1 tool/liter ferrous chloride solution and the aqueous 1 mol/liter cobalt sulfate solution were changed to 395 milliliters, 402 milliliters and 114 milliliters, respectively, to produce a comparative sample of cobalt-containing magnetic iron oxide particles (Sample J).

Comparative Example 5

500 grams of acicular α—FeOOH particles having a BET specific surface area of about 86 m$^2$/gram, a phosphorus content of 0.52% by weight and a silicon content of 0.40% by weight were charged in a small sized rotary kiln and thermally dehydrated at a temperature of 720° C. for 2 hours under air flowing at 3 liters/minute. After the kiln was purged with a N$_2$ gas to expel the air contained therein, the thermal reduction of the dehydrated particles was performed at 360° C. for 2 hours under a hydrogen gas flowing at 3 liters/minute. Then, after allowed to stand cooling while the kiln was purged with N$_2$ to expel the hydrogen gas contained therein, the reduced powder was subjected to an oxidation treatment at 280° C. for 1.5 hours under a gaseous mixture of air and N$_2$ gas (a ratio by volume of air/N$_2$=1/1 ) flowing at 1.5 liters/minute to produce γ—Fe$_2$O$_3$ particles.

The γ—$Fe_2O_3$ particles recovered after cooling had the following characteristics: SSA=47.0 $m^2$/gram, Hc=364 Oe, V=1.13×$10^{-16}$ $cm^3$.

This γ—$Fe_2O_3$ particles were subjected to the dispersion treatment identical to that in Example 1 and then subjected to the cobalt-coating treatment in the same procedure as in Example 1, except that the amounts of the aqueous 10N NaOH solution, the aqueous 1 mol/liter ferrous chloride solution and the aqueous 1 mol/liter cobalt sulfate solution were changed to 375 milliliters, 362 milliliters and 130 milliliters, respectively, to produce a comparative sample of cobalt-containing magnetic iron oxide particles (Sample K).

EXAMPLE 7

In a 30 liter capacity reactor equipped with a air blowing pipe and a stirrer 22 liters of an aqueous ferrous chloride solution containing 25 grams/liter expressed as $Fe^{2+}$ were charged and while the temperature of the solution was maintained at 21° C. with stirring 1.48 liters of an aqueous 400 grams/liter NaOH solution were added to the reactor and then the temperature was maintained at 21° C. for two hours while blowing air into the reactor at a rate of 6 liters/minute to generate γ—FeOOH nuclei. Thereafter, the temperature of the solution was raised to 41° C. and then while blowing air into the reactor, 0.49 liter of an aqueous 400 grams/liter NaOH solution was added over 2.5 hours to effect the growth of the nuclei, thereby completing the reaction of generating acicular γ—FeOOH particles having a BET specific surface area of about 71 $m^2$/gram.

After terminating the air blowing, 162 milliliters of an aqueous 1 mol/liter aluminum chloride solution were added and then 486 milliliters of an aqueous 1N NaOH solution were added over 30 minutes, and moreover, the agitation was continued for 30 minutes while adding dropwise an aqueous 1N NaOH solution to retain the slurry at a pH of 8, whereby the aluminum depositing treatment was completed. The produced γ—FeOOH slurry was filtered, washed and dried to yield acicular γ—FeOOH having an aluminum content of 0.5% by weight. 500 grams of this acicular γ—FeOOH particles were charged in a small sized rotary kiln and thermally dehydrated at 280° C. for one hour under air flowing at 3 liters/minute. After the kiln was purged with a $N_2$ gas to expel the air contained therein, the thermal reduction of the dehydrated particles was performed at 350° C. for one hours under a hydrogen gas flowing at 3 liters/minute. After cooling the reduced particles were added to 3 liters of water and then recovered. The chemical analysis of this reduced particles indicated that they have a $Fe^{2+}$/total Fe of 0.340.

A small amount of the sample taken from the particles was dried in a $N_2$ atmosphere at 60° C. to produce a dried product which was evaluated for various characteristics. The following results were obtained: SSA=33.8 $m^2$/gram, Hc=296 Oe, V=0.38×$10^{-16}$ $cm^3$.

The recovered slurry was agitated by a mixer for 20 minutes to enhance the dispersion and then diluted with water to a solid content of 100 grams/liter. 2 liters of this slurry were charged in a 4 neck flask and then 368 milliliters of an aqueous 10N NaOH solution were added to the slurry. Then with stirring 336 milliliters of an aqueous 1 mol/liter ferrous chloride solution were added over 45 minutes, and then 98 milliliters of an aqueous 1 mol/liter cobalt sulfate solution were added over 60 minutes. Thereafter, the temperature was increased to 45° C. and the agitation was continued for 5 hours to complete the cobalt-coating treatment. The resultant slurry was filtered, washed, and dried in an atmosphere of nitrogen gas at 120° C. to produce cobalt-containing magnetic iron oxide particles (Sample L).

EXAMPLE 8

γ—FeOOH particles were produced in the same manner as in Example 7.

Then the aluminum depositing treatment was conducted in the identical procedure to that in Example 7, except that the amounts of the aqueous 1 mol/liter aluminum chloride solution and the aqueous 1N NaOH solution to be added were changed to 97 milliliters and 292 milliliters, respectively. The produced γ-FeOOH slurry was filtered, washed, and dried to produce acicular γ-FeOOH particles having an aluminum content of 0.3% by weight. 500 grams of this acicular γ—FeOOH particles were charged in a small sized rotary kiln and subjected to the thermal dehydration and reduction identically to the case in Example 7 to produce reduced particles which were added to 3 liters of water and then recovered.

The reduced particles were evaluated for various characteristics in the same manner as in Example 7. It was found that they have the following characteristics: $Fe^{2+}$/total Fe=0.332, SSA=30.9 $m^2$/gram, Hc=327 Oe, V=0.50×$10^{-16}$ $cm^3$.

The recovered slurry was subjected to the dispersion treatment and the cobalt-coating treatment in the same procedure as that in Example 7 to produce cobalt-containing magnetic iron oxide particles (Sample M).

EXAMPLE 9

γ—FeOOH particles were produced in the same manner as in Example 7.

Then the aluminum depositing treatment was conducted in the identical procedure to that in Example 7, except that the amounts of the aqueous 1 mol/liter aluminum chloride solution and the aqueous 1N NaOH solution to be added were changed to 32 milliliters and 97 milliliters, respectively. The produced γ—FeOOH slurry was filtered, washed, and dried to produce acicular γ—FeOOH particles having an aluminum content of 0.1% by weight. 500 grams of this acicular γ—FeOOH particles were charged in a small sized rotary kiln and thermally dehydrated at 280° C. for one hour under air flowing at 3 liters/minute. After the kiln was purged with a $N_2$ gas to expel the air contained therein, the thermal reduction of the dehydrated particles was performed at 280° C. for 2 hours under a hydrogen gas flowing at 3 liters/minute. After cooling the reduced particles were added to 3 liters of water and recovered.

The reduced particles were evaluated for various characteristics in the same manner as in Example 7. It was found that they have the following characteristics: $Fe^{2+}$/total Fe=0.311, SSA=32.9 $m^2$/gram, Hc=318 Oe, V=0.61×$10^{-16}$ $cm^3$.

The recovered slurry was subjected to the dispersion treatment and the cobalt-coating treatment in the same procedure as that in Example 7 to produce cobalt-containing magnetic iron oxide particles (Sample N).

EXAMPLE 10

γ—FeOOH particles were produced and subjected to the aluminum coating treatment similarly to the case in Example 7 to produce acicular γ—FeOOH having an aluminum content of 0.5% by weight.

500 grams of this acicular γ—FeOOH particles were charged in a small sized rotary kiln and thermally dehydrated under air flowing at 3 liters/minute at 280° C. for one hour. After the kiln was purged with a $N_2$ gas to expel the air contained therein, the thermal reduction of the dehydrated particles was performed under a hydrogen gas flowing at 3 liters/minute at 350° C. for one hour. After allowed to stand cooling while the kiln was purged with $N_2$ to expel the hydrogen gas contained therein, the reduced particles were oxidized at 150° C. for 1.5 hours under a gaseous mixture of air and $N_2$ (a ratio by volume of air/$N_2$=1/1) flowing at 3 liters/minute to produce berthollide particles.

After leaving to stand cooling, the recovered berthollide particles had the following characteristics: $Fe^{2+}$/total Fe=0.105, SSA=32.9 $m^2$/gram, Hc=340 Oe, V=0.90×10$^{-16}$ cm$^3$.

200 grams of this berthollide particles and 2 liters of water were placed in a mixer and agitated for 20 minutes facilitating dispersion to produce a slurry. This slurry were charged in a 4 neck flask and then 384 milliliters of an aqueous 10N NaOH solution were added to the slurry. Then with stirring 376 milliliters of an aqueous 1 mol/liter ferrous chloride solution were added over 45 minutes, and then 106 milliliters of an aqueous 1 mol/liter cobalt sulfate solution were added over 60 minutes. Thereafter, the temperature was increased to 45° C. and the agitation was continued for 5 hours to complete the cobalt-coating treatment. The resultant slurry was filtered, washed, and dried in an atmosphere of nitrogen gas at 120° C. to produce cobalt-containing magnetic iron oxide particles (Sample O).

Figure 1:
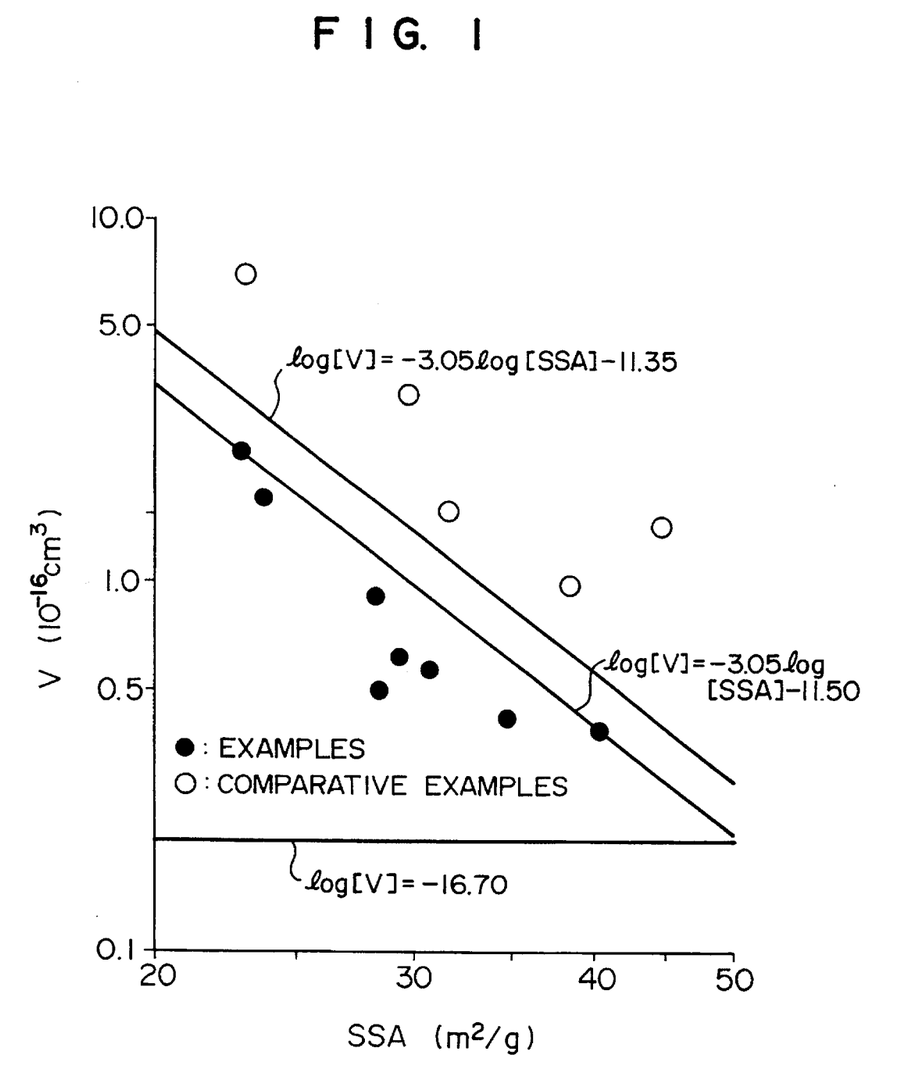
FIG. 1 is a graph showing a relationship between the magnetic switching unit (V) and the BET specific surface area (SSA) obtained in Examples of the present invention and Comparative Examples.

The results obtained by evaluating the cobalt-containing magnetic iron oxide particles in the Examples and Comparative Examples as above (Samples A to O) for BET specific surface area, coercive force, $Fe^{2+}$/total Fe and magnetic switching unit are set forth in Table 1, and those obtained by preparing video tapes with the magnetic particles in the manner as described below and evaluating the tapes for the noise characteristic (Y-S/N) are in Table 2. Moreover, the video noise characteristic (color signal noise characteristic, C-S/N) obtained by preparing video tapes with the cobalt-containing magnetic iron oxide particles and evaluating the tapes for the noise characteristic (Y-S/N) are in Table 2. Moreover, the relationship between the magnetic switching unit and the BET specific surface area obtained from the results in Table 1 is shown in FIG. 1.

From the foregoing, it can be understood that the cobalt-containing magnetic iron oxide particles according to the present invention are excellent in dispersibility and orientation property and that the video tapes made with such magnetic particles are excellent in color signal noise characteristic (C-S/N) owing to the excellent surface property of the video tapes. It also can be found that the relationship between the BET specific surface area and the magnetic switching unit is characterized by satisfying the equation, log[V]≦−3.05 log[SSA]−11.35 with a reduced magnetic switching unit, and that the noise characteristic (Y-S/N) is excellent due to the reduced magnetic switching unit.

Production of video tapes and measurement of noise characteristics

Preparation of a paint was accomplished with the following formulation:

|  | Parts by weight |
|---|---|
| Cobalt-containing magnetic iron oxide particles | 100 |
| Vinyl chloride/vinyl acetate copolymer | 6.0 |
| Polyurethane resin | 14.2 |
| Dispersant | 3.6 |
| Electroconducting agent | 3.2 |
| Abrading agent | 2.0 |
| Lubricant | 1.2 |
| Curing agent | 2.4 |
| Solvent | 249 |

The magnetic paint with the above formulation was applied onto a polyester base film to a thickness of 5 μm, dried, calendered, and then cured at 60° C. for 16 hours. Thereafter, the film was cut by a slitter to a width of 0.5 inch and set in VHS cassette half.

The measurements of the video noise characteristics (Y-S/N, C-S/N) were conducted with a video noise meter (925 D/l, available from SHIBASOKU Co. Ltd.).

TABLE 1

|  | Sample | Precursor | Al Wt. % | Dehydration Temperature | SSA $m^2$/gr | Hc Oe | $Fe^{2+}$/Total Fe | V (×10$^{-16}$ cm$^3$) | Video noise characteristic Y-S/N (dB) |
|---|---|---|---|---|---|---|---|---|---|
| Example 1 | A | γ-FeOOH | — | 300 | 29.3 | 630 | 0.238 | 0.60 | 3.1 |
| 2 | B | γ-FeOOH | — | — | 28.6 | 650 | 0.230 | 0.50 | 2.8 |
| 3 | C | γ-FeOOH | 0.5 | 280 | 23.8 | 645 | 0.242 | 1.70 | 1.6 |
| 4 | D | γ-FeOOH | 0.5 | 280 | 23.0 | 630 | 0.180 | 2.30 | 1.2 |
| 5 | E | γ-FeOOH | — | 330 | 34.9 | 625 | 0.220 | 0.43 | 3.5 |
| 6 | F | γ-FeOOH | — | 330 | 40.2 | 614 | 0.205 | 0.40 | 3.6 |
| Co. Ex. 1 | G | γ-FeOOH | — | 630 | 31.8 | 645 | 0.235 | 1.60 | 1.0 |
| 2 | H | α-FeOOH | — | — | 38.5 | 650 | 0.263 | 1.00 | 2.5 |
| 3 | I | γ-FeOOH | — | 500 | 23.1 | 643 | 0.088 | 6.99 | 0.2 |
| 4 | J | α-FeOOH | — | 720 | 29.8 | 646 | 0.088 | 3.26 | 1.1 |
| 5 | K | α-FeOOH | — | 720 | 44.7 | 642 | 0.085 | 1.43 | 2.6 |
| Example 7 | L | γ-FeOOH | 0.5 | 280 | 30.8 | 636 | 0.22 | 0.58 | 2.2 |
| 8 | M | γ-FeOOH | 0.3 | 280 | 27.5 | 696 | 0.25 | 0.62 | 3.0 |
| 9 | N | γ-FeOOH | 0.1 | 280 | 28.9 | 660 | 0.23 | 0.77 | 1.1 |
| 10 | O | γ-FeOOH | 0.5 | 280 | 28.3 | 623 | 0.16 | 0.92 | 2.5 |

TABLE 2

|  | Sample | Al Wt. % | Tape characteristics | | | | Video noise characteristics | |
|---|---|---|---|---|---|---|---|---|
|  |  |  | Hc (Oe) | SQ | OR | SFD | Y-S/N (dB) | C-S/N (dB) |
| Example 1 | A | — | 705 | .756 | 1.62 | 0.44 | 3.1 | 0.1 |
| 7 | L | 0.5 | 708 | .802 | 1.93 | 0.39 | 2.2 | 0.6 |
| 8 | M | 0.3 | 755 | .781 | 1.73 | 0.43 | 3.0 | 0.3 |
| 9 | N | 0.1 | 699 | .766 | 1.67 | 0.42 | 1.1 | 0.6 |
| 10 | O | 0.5 | 703 | .813 | 1.94 | 0.42 | 2.5 | 0.4 |
| Co. Ex. 2 | H | — | 702 | .742 | 1.48 | 0.51 | 2.5 | −0.5 |

The cobalt-containing magnetic iron oxide particles of the present invention are suitable for elements to be used in magnetic recording mediums, especially those in image recording mediums as they have good dispersibility in mediums and excellent noise characteristics (Y-S/N, C-S/N).

The process of the present invention enables extremely effective production of cobalt-containing magnetic iron oxide particles suitable for the elements in magnetic recording mediums from the precursor, γ—FeOOH in easy operation, so that it is very useful in industry.

What is claimed is:

1. Cobalt-coated magnetic iron oxide particles satisfying the following equations (1), (2) and (3):

$$20 \leq SSA \leq 50 \quad (1)$$

$$-16.70 \leq \log [V] \leq -3.05 \log [SSA] - 11.35 \quad (2)$$

$$0.10 \leq Fe^{2+}/\text{total Fe} \leq 0.30 \quad (3)$$

where SSA is a BET specific surface area (m$^2$/g), and V is a magnetic switching unit (cm$^3$).

2. The cobalt-coated magnetic iron oxide particles according to claim 1, wherein the equation (2) is $-16.70 \leq \log [V] \leq -3.05 \log [SSA] - 11.50$.

3. The cobalt-coated magnetic iron oxide particles according to claim 1, wherein the equation (3) is $0.20 \leq Fe^{2+}/\text{total Fe} \leq 0.30$.

4. A process for producing cobalt-coated magnetic iron oxide particles according to claim 1, comprising the steps of:

producing iron oxide particles having a concentration of Fe$^{2+}$ of 0.10 to 0.36 as expressed by Fe$^{2+}$/total Fe by directly reducing lepidocrocite particles, or thermally dehydrating lepidocrocite particles at a lower temperature than that causing transformation to hematite particles and then reducing the dehydrate in the range of 250° to 500° C.; and then conducting oxidation at a temperature of 200° C. or lower; and coating a cobalt compound or combination of a cobalt compound and at least one compound of metals other than cobalt which improve the ferromagnetic and noise characteristics of the resulting coated particles, on the surfaces of the iron oxide particles in an oxidizing or inert atmosphere.

5. The process for producing cobalt-coated magnetic iron oxide particles according to claim 4, wherein the iron oxide particles have a concentration of Fe$^{2+}$ of 0.20 to 0.36 as expressed by Fe$^{2+}$/total Fe.

6. The process for producing cobalt-coated magnetic iron oxide particles according to claim 4, wherein the iron oxide particles have a concentration of Fe$^{2+}$ of 0.28 to 0.36 as expressed by Fe$^{2+}$/total Fe.

7. The process for producing cobalt-coated magnetic iron oxide particles according to claim 4, wherein the lepidocrocite particles have an aluminum compound deposited on the surfaces of its particles.

8. The process for producing cobalt-coated magnetic iron oxide particles according to claim 7, wherein the amount of the aluminum compound deposited is 0.05 to 3.0% by weight Al based on the weight of the lepidocrocite.

9. The process for producing cobalt-coated magnetic iron oxide particles according to claim 4, wherein said step of coating a cobalt compound or combination of a cobalt compound and at least one compound of metals other than cobalt, said at least one compound of metals is selected from the group consisting of Fe, Mn, Zn, Ni and Cr.

* * * * *